United States Patent [19]
Evans et al.

[11] Patent Number: 5,948,023
[45] Date of Patent: Sep. 7, 1999

[54] MONITORING AND/OR CONTROL SYSTEM FOR A DUAL-ENGINE HELICOPTER FOR ONE ENGINE INOPERATIVE FLIGHT OPERATIONS

[75] Inventors: Charles W. Evans, Norfolk, Conn.; David L. Jenson, Stuart, Fla.; John M. Kronsnoble, West Palm Beach, Fla.; Charles E. Greenberg, Jupiter, Fla.

[73] Assignee: Sikorsky Aircraft Corporation, Stratford, Conn.

[21] Appl. No.: 08/879,205

[22] Filed: Jun. 19, 1997

[51] Int. Cl.$^6$ .................................................. G06F 165/00
[52] U.S. Cl. ........................... 701/3; 701/114; 244/17.13; 244/175; 244/194
[58] Field of Search .................... 701/3, 114; 244/17.13, 244/175, 194

[56] References Cited

U.S. PATENT DOCUMENTS

| | | | |
|---|---|---|---|
| 5,001,646 | 3/1991 | Caldwell et al. | 364/434 |
| 5,781,126 | 7/1998 | Paterson et al. | 340/970 |
| 5,873,546 | 2/1999 | Evans et al. | 244/17.13 |

OTHER PUBLICATIONS

D. Trivier and O. Bosqui, "30–Second/2–Minute One Engine Inoperative Certification for the AS 332 Super Puma MK II", Sep. 15–18, 1992.

(List continued on next page.)

*Primary Examiner*—William A. Cuchlinski, Jr.
*Assistant Examiner*—Olga Hernandez
*Attorney, Agent, or Firm*—Terrance J. Radke

[57] ABSTRACT

A monitoring and control system for a dual-engine helicopter for OEI flight operations includes a parametric indicator operative in response to sensor signals for monitoring an engine gas generator speed parameter N1 during dual-engine and OEI flight operations. The indicator includes a rotatable needle that provides an analog indication of the current value of the N1 parameter. For dual-engine flight operations, the indicator includes a first DE indicia defining a normal operating range for the N1 parameter, a second DE indicia that defines a precautionary operating range for the N1 parameter, and a DE indicium that defines a take off power limit for the N1 parameter. For OEI flight operations, the indicator further includes an expanded scale, OEI indicia that defines an OEI precautionary operating range for the N1 parameter having a lower limit of that defines a maximum continuous OEI power rating for the N1 parameter, a first OEI indicium that defines a 2-minute OEI power rating for the N1 parameter, a second OEI indicium that defines a 30-second OEI power rating for the N1 parameter. The first and second OEI indicia in combination define a 30-second OEI operating range for the N1 parameter, and the first OEI indicium and the DE indicium in combination define a 2-minute OEI operating range for the N1 parameter. The indicator further includes a first dedicated bi-colored lamp fixture disposed in combination with the first OEI indicium that is operative in response to a first activation signal to illuminate in a first color to indicate that the 2-minute OEI power rating is enabled and is operative in response to a second activation signal to illuminate in a second color to indicate that the helicopter is being operated in the 2-minute OEI operating range, and a second dedicated bi-colored lamp fixture disposed in combination with the second OEI indicium that is operative in response to a first activation signal to illuminate in a first color to indicate that the 30-second OEI power rating is enabled and is operative in response to a second activation signal to illuminate in a second color to indicate that the helicopter is being operated in the 30-second OEI operating range. Control during OEI flight operations is provided by a three-position OEI switch assembly integrated in combination with the grip of the cyclic control stick, the three-position OEI switch assembly including a three-position select switch that is manually operable to select the 30-second OEI power rating, the 2-minute OEI power rating, or the maximum continuous OEI power rating for OEI flight operations by manual manipulation of the three-position select switch to a first position, a second position, and a third position, respectively.

5 Claims, 2 Drawing Sheets

OTHER PUBLICATIONS

J. Cole, C. Evans, C. Greenberg, Sr., and K. Saal, "Development and Qualification of the S–76C+ Helicopter with 30–second/2–minute QEI Power Ratings", Apr. 29–May 1, 1997.

Sikorsky S–76 Flight Manual, FAA Approved Jun. 19, 1996, pp. 1–13 to –15; 1–19 to –20; 1–22; 3–2; 1–1 to –4; 1–7 to 8; 1–10 to –13; 1–15 to –16; 5–6 to –7.

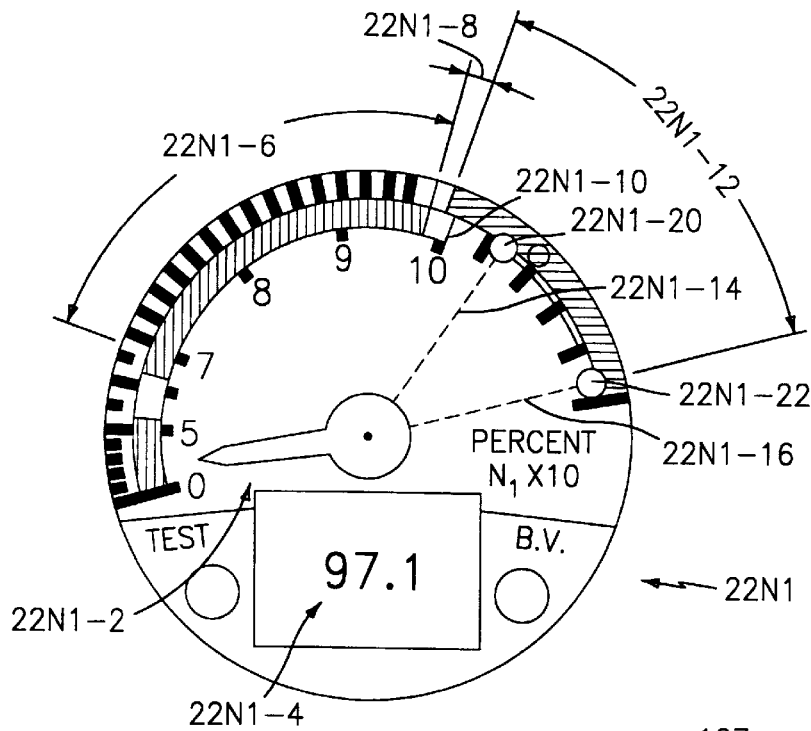
FIG. 3
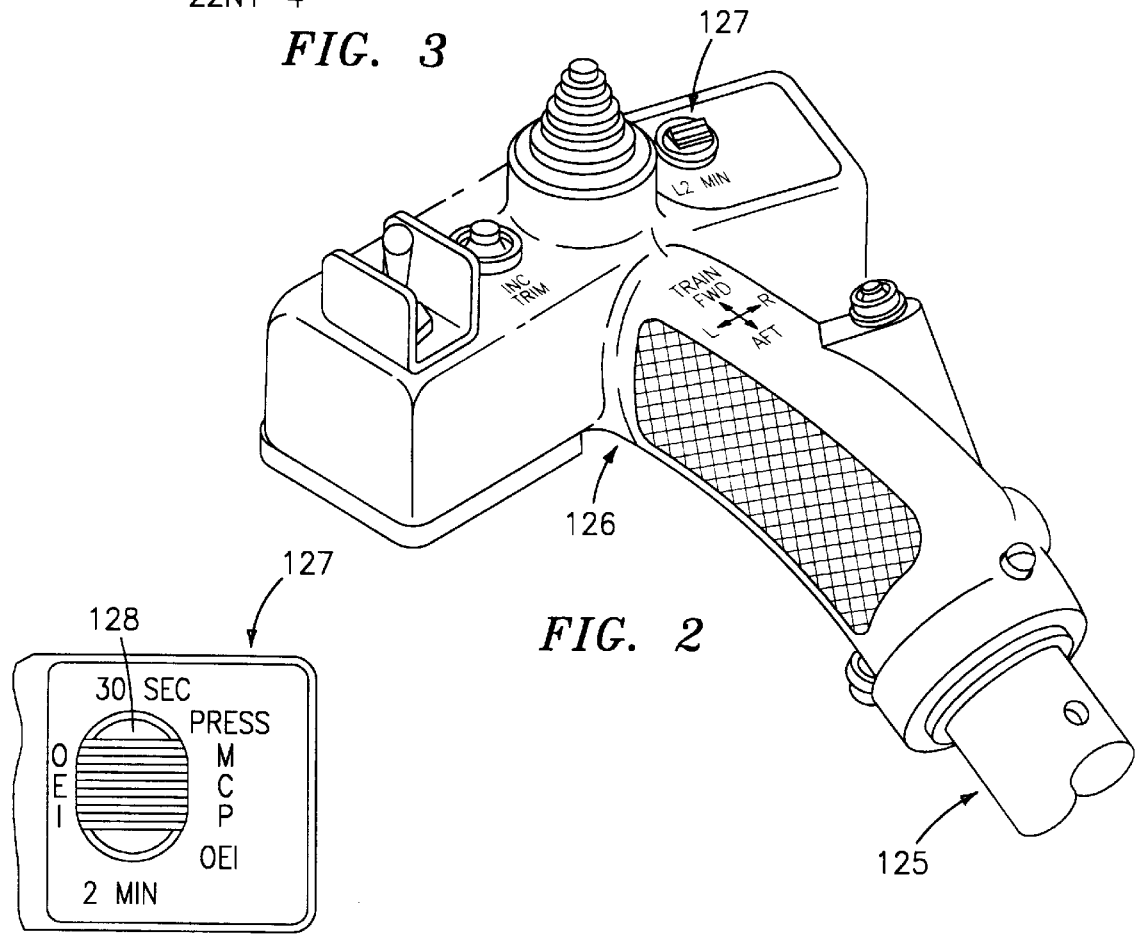
FIG. 2
FIG. 2A

MONITORING AND/OR CONTROL SYSTEM FOR A DUAL-ENGINE HELICOPTER FOR ONE ENGINE INOPERATIVE FLIGHT OPERATIONS

TECHNICAL FIELD

The present invention relates generally to aircraft monitoring and control systems, and more particularly, to a monitoring and/or control system for a dual-engine helicopter for one engine inoperative (OEI) flight operations.

BACKGROUND OF THE INVENTION

Many of the helicopters being operated today embody a dual-engine powerplant system. A dual-engine powerplant system enhances the normal flight capabilities of a helicopter, thereby increasing the utility of the helicopter for revenue flight operations. In addition, a significant feature inherent in a dual-engine helicopter is the capability of the dual-engine powerplant system to provide sufficient power to facilitate continued flight operations in safety, particularly take offs and landings (take offs and landings being the most critical segments of the helicopter flight envelope), in the event of a one engine inoperative (OEI) condition, e.g., a single engine failure.

Since the OEI condition is statistically a low-occurrence event, the engines of a helicopter dual-engine powerplant system are designed primarily for dual-engine flight operations. That is, each engine is designed to specific power limits or ratings for dual-engine flight operations, e.g., a startup power rating, a take off power rating, a maximum continuous power rating (maximum power settings at which the engines may be continuously operated during dual-engine flight operations without incurring damage), a normal cruise power rating (power settings slightly lower than maximum continuous power rating that are typically established to comply with the engine maker's warranties), a 10-second transient power rating, and a 20-second transient power rating. During dual-engine flight operations, therefore, the helicopter is operated in such a manner that the design power ratings of the engines are not exceeded. In the sophisticated helicopters of today, the operation of the powerplant system is primarily controlled by a computer system (discussed in further detail hereinbelow), and such an engine computer control system typically includes protective logic routines (in the form of hardware, firmware, software, and/or combinations thereof) that automatically prevent the engine design power ratings from being exceeded during dual-engine flight operations.

A dual-engine helicopter that experiences an OEI condition, especially during a take off or landing, is subject to a potentially hazardous flight condition since the normal design power ratings of the single operative engine do not provide sufficient power for the safe operation of the helicopter under such a circumstance. Aviation regulatory authorities, therefore, have established general overdesign criteria for the powerplant system of a dual-engine helicopter to ensure that the helicopter can be safely operated utilizing a single operative engine during OEI flight operations. These criteria have resulted in the overdesign of the helicopter powerplant system so that a single operative engine is capable of providing the requisite emergency or OEI power necessary for safe helicopter flight operations during an OEI condition.

The helicopter powerplant system is overdesigned so that the single operative engine has the capability to provide a 30-second OEI power rating, a 2-minute OEI power rating, and a maximum continuous OEI power rating. These OEI power ratings are higher than the normal design ratings of the powerplant system, and therefore, are intended for use only during an OEI condition.

The 30-second OEI power rating was established to ensure that the single operative engine provides a sufficient margin of power so that a dual-engine helicopter can continue a take off flight profile to a take off safety speed ($V_{toss}$) in relative safety while avoiding obstacles such as trees, an elevated platform, and/or the ground. The engine computer control system of the powerplant system is operative, by means of default logic (implemented in the form of hardware, firmware, software, and/or combinations thereof) to cause the single operative engine to automatically default to the 30-second OEI power rating in the event of an OEI condition. The 30-second OEI power rating is of such magnitude that there is a statistically-high probability that the single operative engine may be subjected to some degree of damage, e.g., burnout, during OEI flight operations [the engines of a dual-engine powerplant system are certified for up to three applications of the 30-second OEI power rating in a single flight].

The 2-minute OEI power rating was established to ensure that the single operative engine provides a sufficient margin of power so that a dual-engine helicopter operating at $V_{toss}$ can initiate and maintain an ascending flight profile at a sufficient vertical speed, e.g., 100 feet/minute, to reach a safe cruising altitude within two minutes after implementation of the 2-minute OEI power rating without resort to the 30-second OEI power rating. The maximum continuous OEI power rating was established to ensure that the single operative engine provides a continuous margin of power, i.e., use of the maximum continuous OEI power rating cannot be time limited, so that the dual-engine helicopter can continue OEI flight operations at the safe cruising altitude to reach a distant landing site. For example, in the case of an OEI take off flight profile from an elevated offshore platform, the most propitious landing site is most probably the nearest adjacent landmass. For a most efficacious OEI control system, the 30-second OEI power rating, the 2-minute OEI power rating and the maximum continuous OEI power rating should be manually selectable by the pilot.

The aviation regulatory authorities also require that an OEI monitoring system be provided for OEI flight operations that has the functional capability to provide the pilot with continual cognitive awareness of which OEI power rating, i.e., the 30-second OEI power rating, the 2-minute OEI power rating, or the maximum continuous OEI power rating, the single operative engine of a dual-engine helicopter is being operated under, and when the allowable time for usage of the 30-second and 2-minute OEI power ratings has elapsed. The OEI monitoring system should be ergonometrically configured to optimize the functional task of visually monitoring critical OEI parametric information and the functional task of visually monitoring OEI flight operations. In addition, the OEI monitoring system should be ergonometrically optimized for visual efficiency, i.e., to present a maximum of OEI parametric information with minimal visual scanning by the pilot. Furthermore, the OEI monitoring system should have the functional capability of readily alerting the pilot to status changes with respect to displayed OEI parametric information.

DISCLOSURE OF THE INVENTION

Objects of the present invention include providing a monitoring and control system for a dual-engine helicopter for one engine inoperative (OEI) flight operations that has the functional capability to provide continual cognitive awareness of whether the helicopter is being operated under a 30-second OEI power rating, a 2-minute OEI power rating, or a maximum continuous OEI power rating during OEI flight operations and when the allowable time for usage of the 30-second and 2-minute OEI power ratings has elapsed, has an ergonometric configuration that optimizes the functional task of visually monitoring critical OEI parametric information and the functional task of visually monitoring OEI flight operations, is ergonometrically optimized for visual efficiency, has the functional capability of readily alerting the pilot to status changes with respect to OEI parametric information, and provides a manual selection capability for operation of the dual-engine helicopter under the 30-second OEI power rating, the 2-minute OEI power rating, or the maximum continuous OEI power rating during OEI flight operations.

These and other objects of the present invention are achieved by one embodiment of a monitoring and control system for a dual-engine helicopter for OEI flight operations that includes a parametric indicator operative in response to sensor signals for monitoring an engine gas generator speed parameter N1 during dual-engine flight operations and OEI flight operations. The parametric indicator includes a rotatable needle that is operative to provide a analog indication of the current value of the N1 parameter, a first DE indicia that defines a normal operating range for the N1 parameter during dual-engine flight operations, a second DE indicia that defines a precautionary operating range for the N1 parameter during dual-engine flight operations, and a DE indicium that defines a take off power limit for the N1 parameter during dual-engine flight operations.

The parametric indicator further includes an expanded scale, OEI indicia that defines an OEI precautionary operating range for the N1 parameter during OEI flight operations wherein the lower limit of said OEI precautionary operating range defines a maximum continuous OEI power rating for the N1 parameter during OEI flight operations, a first OEI indicium that defines a 2-minute OEI power rating for the N1 parameter during OEI flight operations, a second OEI indicium that defines a 30-second OEI power rating for the N1 parameter during OEI flight operations, and wherein the first and second OEI indicia in combination define a 30-second OEI operating range for the N1 parameter, and wherein first OEI indicium and the DE indicium in combination define a 2-minute OEI operating range for the N1 parameter.

The parametric indicator further includes a first dedicated bi-colored lamp fixture disposed in combination with the first OEI indicium that is operative in response to a first activation signal to illuminate steadily in a first color to indicate that the 2-minute OEI power rating is enabled for a single operative engine and is operative in response to a second activation signal to illuminate steadily in a second color to indicate that the single operative engine is operating in the 2-minute OEI operating range, and a second dedicated bi-colored lamp fixture disposed in combination with the second OEI indicium that is operative in response to a first activation signal to illuminate steadily in a first color to indicate that the 30-second OEI power rating is enabled for the single operative engine and is operative in response to a second activation signal to illuminate steadily in a second color to indicate that the single operative engine is operating in the 30-second OEI operating range.

Control of the single operative engine during OEI flight operations is provided by a three-position OEI switch assembly integrated in combination with the grip of the collective control stick, the three-position OEI switch assembly including a three-position select switch that is operable to manually select the 30-second OEI power rating, the 2-minute OEI power rating, or the maximum continuous OEI power rating for a single operative engine during OEI flight operations by appropriate manual manipulation of the three-position select switch to a first position, a second position, and a third position, respectively.

BRIEF DESCRIPTION OF THE DRAWINGS

A more complete understanding of the present invention and the attendant features and advantages thereof may be had by reference to the following detailed description of the invention when considered in conjunction with the accompanying drawings wherein:

FIG. 2 is a partial perspective view of an exemplary collective control stick having a grip that includes a three-position OEI switch assembly integrated in combination therewith that functions as an OEI control system for the exemplary powerplant system depicted in FIG. 1.

FIG. 2A is an enlarged plan view of the three-position select switch of the three-position OEI switch assembly of FIG. 3.

FIG. 3 is a detailed plan view of the configuration of an N1 parametric indicator (N1 tachometer) for a helicopter cockpit instrument display system that functions as an OEI monitoring system for the exemplary powerplant system depicted in FIG. 1.

BEST MODE FOR CARRYING OUT THE INVENTION

Figure 1:
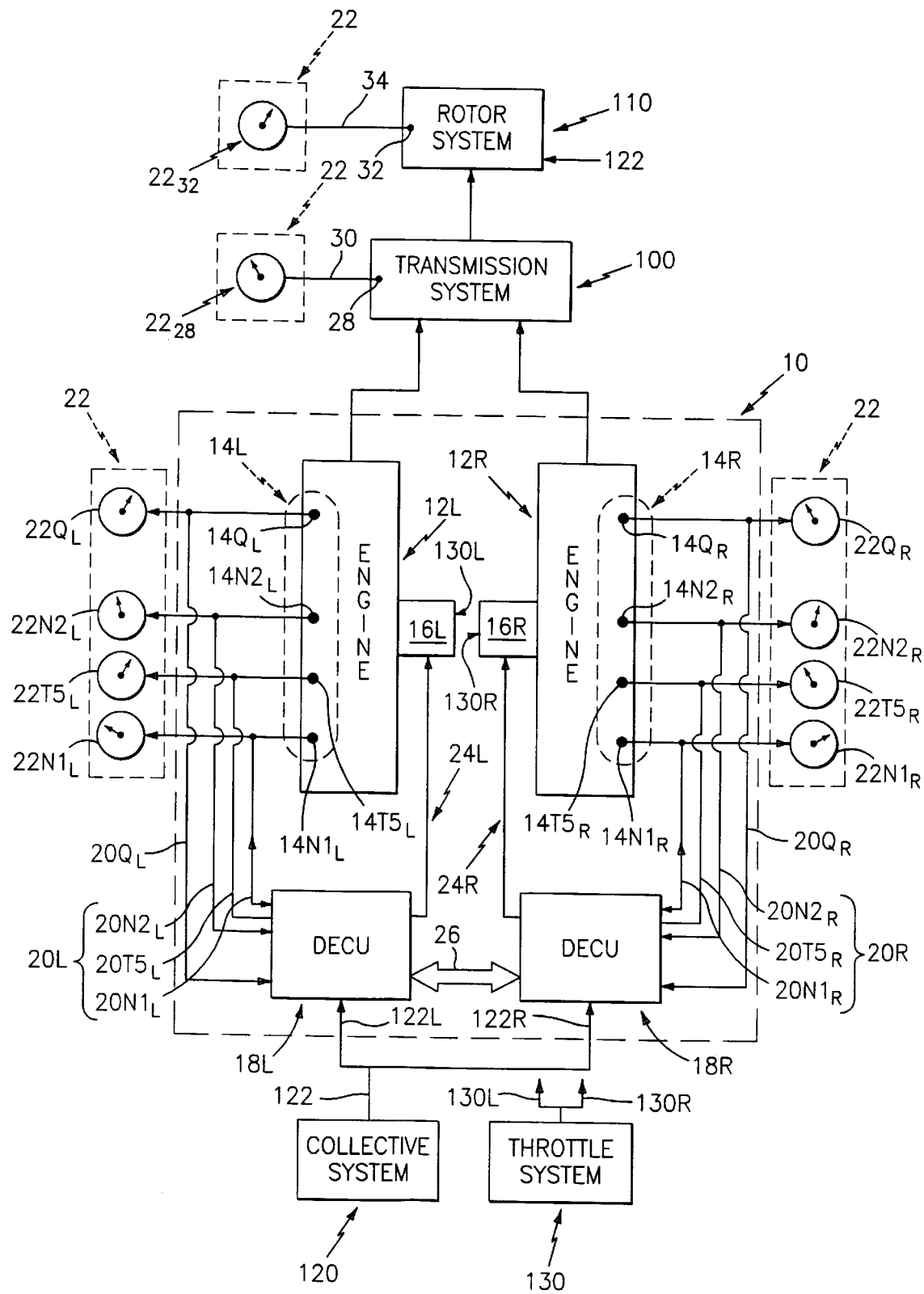
FIG. 1 is a schematic block diagram of selected elements of an exemplary powerplant system for a dual-engine helicopter and selected elements that are functionally integrated in combination with the powerplant system.

Referring now to the drawings wherein like reference numerals and characters represent corresponding or similar elements throughout the several views, FIG. 1 illustrates selected elements of an exemplary dual-engine powerplant system 10 for a dual-engine helicopter and selected elements that are functionally integrated in combination with the powerplant system 10. The dual-engine powerplant system 10 is mechanically integrated in combination with the helicopter transmission system 100, which, in turn, is mechanically integrated in combination with the helicopter rotor system 110. The powerplant system 10 generates the power required for helicopter flight operations and couples such power to the helicopter rotor system 110 by means of the transmission system 100. The pilot's inputs to the powerplant system 10 to control helicopter flight operations are effected by means of a collective system 120 and/or a manual throttle system 130.

The powerplant system 10 comprises left and right engine packages 12L, 12R, a set of sensors 14L, 14R associated with each engine package 12L, 12R for monitoring the operating parameters thereof, a fuel subsystem 16L, 16R fluidically interconnected to each engine package 12L, 12R (for the purposes of the instant disclosure, the helicopter fuel subsystem is defined as part of the powerplant system 10), and a digital electronic control unit (DECU) 18L, 18R electronically interconnected to the corresponding fuel subsystems 16L, 16R of the engine packages 12L, 12R, respectively. A plurality of signal lines 20L, 20R electronically interconnect individual sensors 14L, 14R to the respective DECUs 18L, 18R, and to a cockpit instrument display system 22 that comprises a plurality of parametric indicators for, inter alia, each engine package 12L, 12R. The DECUs 18L, 18R are electronically interconnected to the respective fuel subsystems 16L, 16R by means of signal lines 24L, 24R. The DECUs 18L, 18R are electronically interconnected by means of a signal line 26.

A sensor 28 is integrated in combination with the helicopter transmission system 100 to monitor the torque output therefrom and signals representative of the torque output (W) are transmitted to the cockpit instrument display system 22 by means of a signal line 30. A sensor 32 is integrated in combination with the helicopter rotor system 110 to monitor the rotational speed of the main rotor shaft and signals representative of the rotational speed of the main rotor shaft ($N_R$) are transmitted to the cockpit instrument display system 22 by means of a signal line 34.

To facilitate a better understanding of the functional features and characteristics of the exemplary powerplant system 10 described in the preceding paragraph, the functional features and characteristics of the powerplant system 10 are further described herein in terms of the powerplant system of an S-76C+ helicopter (S-76® is a registered trademark of the Sikorsky Aircraft Corporation) manufactured by Sikorsky Aircraft Corporation. One skilled in the art will appreciate that the ensuing disclosure is generally applicable to most, if not all, dual-engine helicopters and the functional features and characteristics thereof that are associated with OEI flight operations (OEI flight operations as used herein refers to both actual OEI flight conditions and OEI flight training).

The engine packages 12L, 12R of the S-76C+ dual-engine powerplant system 10 include Turbomeca Arriel 2S1 engines (each engine comprising an accessory gearbox module, an axial compressor module, a high pressure assembly module, a power turbine module, and a reduction gearbox module) and a pair of independent shafts (one shaft functioning as an input shaft that couples the torque/power generated by the engine 12L/12R to the transmission system 100). For dual-engine flight operations, each Turbomeca Arriel 2S1 engine 12L, 12R has a takeoff power rating of 856 shaft horsepower (SHP), a maximum continuous power rating of 794 SHP, and a normal cruise power rating of 774 SHP. For one engine inoperative (OEI) flight operations, each Turbomeca Arriel 2S1 engine 12L, 12R has a 30-second OEI power rating of 980 SHP, a 2-minute OEI power rating of 889 SHP, and a maximum continuous OEI power rating of 856 SHP.

The sensor set 14 monitors selected operating parameters of the Turbomeca Arriel 2S1 engines 12L, 12R and generates signals representative of such operating parameters for both dual-engine flight operations and OEI flight operations. Individual sensors $14N1_L$, $14N1_R$ monitor engine gas generator speed (N1 expressed as a percentage) of the respective engines 12L, 12R, individual sensors $14N2_L$, $14N2_R$ monitor engine power turbine speed (N2 expressed as a percentage) of the respective engines 12L, 12R, individual sensors $14Q_L$, $14Q_R$ monitor engine torque (Q expressed as a percentage) generated by the respective engines 12L, 12R, and individual sensors $14T5_L$, $14T5_R$ monitor engine power turbine inlet temperature (T5 expressed in degrees Centigrade) of the respective engines 12L, 12R. This set of sensors 14 includes redundant sensors for the N1, N2, and T5 operating parameters.

Signals generated by the individual sensors $14N1_L$, $14N1_R$, $14N2_L$, $14N2_R$, $14Q_L$, $14Q_R$, $14T5_L$, $14T5_R$ are coupled to the cockpit instrument display system 22 and the corresponding DECUs 18L, 18R by means of dedicated signal lines $20N1_L$, $20N1_R$, $20N2_L$, $20N2_R$, $20Q_L$, $20Q_R$, $20T5_L$, $20T5_R$. The sensor signals $14N1_L$, $14N1_R$, $14N2_L$, $14N2_R$, $14Q_L$, $14Q_R$, $14T5_L$, $14T5_R$ may be coupled directly to the cockpit instrument display system 22; or alternatively, the sensor signals $14N1_L$, $14N1_R$, $14N2_L$, $14N2_R$, $14Q_L$, $14Q_R$, $14T5_L$, $14T5_R$ may be first coupled to the corresponding DECUs 18L, 18R for signal processing and then subsequently coupled to the cockpit instrument display system 22, or alternatively, selected sensor signals $14N1_L$, $14N1_R$, $14N2_L$, $14N2_R$, $14Q_L$, $14Q_R$, $14T5_L$, $14T5_R$ may be directly coupled directed to the cockpit instrument display system 22 while other selected sensor signals $14N1_L$, $14N1_R$, $14N2_L$, $14N2_R$, $14Q_L$, $14Q_R$, $14T5_L$, $14T5_R$ may be first processed by the corresponding DECUs 18L, 18R before being coupled to the cockpit instrument display system 22. For the described embodiment, the cockpit instrument display system 22 comprises individual indicators $22N1_L$, $22N1_R$ (N1 tachometers) for displaying the N1 parameter of each engine 12L, 12R, respectively, individual indicators $22N2_L$, $22N2_R$ (N2 tachometers) for displaying the N2 parameter of each engine 12L, 12R, respectively(for the S-76C+ helicopter, a single triple tachometer provides the functions of the individual indicators $22N2_L$, $22N2_R$, with such single triple tachometer including individual rotatable needles for displaying the parameters N2 of the respective engines 12L, 12R—the triple tachometer also includes another rotatable needle for the parameter $N_R$), individual indicators $22Q_L$, $22Q_R$ (torquemeters) for displaying the torque Q generated by each engine 12L, 12R, respectively (for the S-76C+ helicopter, a single torquemeter provides the functions of the individual indicators 22QL, 22QR, with such single torquemeter including individual rotatable needles for displaying the torque Q generated the respective engines 12L, 12R), and individual indicators $22T5_L$, $22T5_R$ (T5 indicators) for displaying the T5 parameter of each engine 12L, 12R, respectively. The individual parametric indicators comprising the cockpit instrument display system 22 may be digital, analog, or a combination of both, and are used to monitor the operating parameters described hereinabove during both normal dual-engine flight operations and OEI flight operations.

The sensor 28 monitors transmission torque and the sensor 32 monitors the revolutions per minute of the main rotor shaft (not shown, but an element of the rotor system 100). Signals from these sensors 28, 32 are coupled to the corresponding parametric indicators $22_{28}$ (W expressed as a percentage), $22_{32}$ ($N_R$ expressed as a percentage) of the cockpit instrument display system 22 by means of dedicated signal lines 30, 34, respectively. [In the S-76C+ helicopter, the N2 tachometers $22N2_L$, $22N2_R$ and the $N_R$ tachometer $22_{32}$ are integrated into a single indicator (triple tachometer) for each engine 12L, 12R].

Established numerical values of the operating parameters N1, N2, Q, T5, W described in the preceding paragraphs define the design power limits or ratings (dual-engine flight operations) and the OEI power limits or ratings (OEI flight operations) for the dual-engine powerplant system 10 of any particular helicopter. The first operating parameter N1, N2, Q, T5, W to meet the numerical value established for a specific parameter during dual-engine flight operations or OEI flight operations defines the design power rating or OEI power rating of the dual-engine powerplant system 10. For the S-76C+ dual-engine powerplant system 10, the following numerical values have been established for the operating parameters N1, N2, Q, T5, W that define the design and OEI power ratings of the S-76C+ powerplant system 10:

Dual-Engine Flight Operations:
  Startup: T5=865° C.
  10-Second Transient: W=115% (230% total torque)
  20-Second Transient: N1=101.2%; N2=109%/115%; Q=160%
  Takeoff: N1=100%; N2=108.5%; Q=104%
    T5=912° C.; W=100%
  Max Continuous: N1=97.8%; N2=108.5%; Q=104%
    T5=877° C.; W=100%
  Normal Cruise: N1=97.1%; N2=108.5%; Q=104%
    T5=869° C.; W=100%
OEI Flight Operations:
  30-Second: N1=104.6%; N2=108.5%; Q=135%
    T5=1000° C.; W=136%
  2-Minute: N1=101.2%; N2=108.5%; Q=127%
    T5=941° C.; W=136%
  Max Continuous: N1=100.0%; N2=108.5%; Q=116%
    T5=912° C.; W=128%
  5-Sec Transient: W=150%

The engine fuel subsystem 16L, 16R of the S-76C+ helicopter is a suction-type fuel supply system wherein the individual fuel subsystems 16L, 16R are directly controlled by the corresponding DECU 18L, 18R during dual-engine flight operations and OEI flight operations. Alternatively, the individual fuel subsystems 16L, 16R can be manually controlled as required by the throttle system 130. Each engine fuel subsystem 16L, 16R comprises a primary fuel tank, a low-pressure pump, a filter, a high-pressure pump, a metering valve, pressure drop regulator combination, and associated direct-feed and cross-feed plumbing. Each engine fuel subsystem 16L, 16R is operative, utilizing its primary fuel tank, to provide fuel to the corresponding engine 12L, 12R of the dual-engine powerplant system 10 under control of the corresponding DECU 18L, 18R. Each engine fuel subsystem 16L, 16R is further operative, under certain operating conditions, to provide fuel to the opposite engine or to both engines.

The DECUs 18L, 18R are single channel, fail fixed computer systems that electronically control the operation of the engine fuel subsystems 16L, 16R to regulate the flow of fuel to the engines 12L, 12R, thereby controlling the functioning of the engines 12L, 12R during dual-engine flight operations and OEI flight operations. The DECUs 18L, 18R are operative to control, inter alia, the following functions:

automatic engine start including the acceleration of the engines 12L, 12R up to idle.
  acceleration of the engines 12L, 12R from ground idle to flight idle.
  automatic control of gas generator and free turbine rotation speeds (N1, N2) in order to keep the rotational speed of the main rotor shaft at 107% $N_R$.
  automatic load sharing between the engines 12L, 12R using basic N1 matching except when torque limited. The load sharing of N1 will mismatch as required to achieve the pertinent torque limit (see power ratings described hereinabove).
  automatic fault accommodation to enable a back-up sensor 14L/14R if a primary sensor 14L/14R fails, or utilization of a complementary sensor 14L/14R from the other engine 12L/12R (via signal line 26) if required.
  fail fixed control upon detection of a DECU major fault and resultant manual control (by means of the throttle system 130).
  automatic limiting of engine 12L, 12R power ratings to the design power ratings during dual-engine flight operations (see disclosure hereinabove).
  limiting of engine 12L, 12R power ratings to the OEI power ratings during OEI flight operations—selectable limiting at the three OEI ratings (see disclosure hereinabove and hereinbelow) when enabled or automatic default (DECU default logic) to 30-second OEI power rating when the OEI flight condition does not permit OEI limit selection.
  overspeed protection at 122% N2±1%.
  normal engine 12L, 12R shutdown.
  early warning of a one engine inoperative condition.
  power turbine and gas generator cycle counting.
  30-second and 2-minute usage recording.
  automated engine 12L, 12R health checks.

The pilot controls the flight operations of the helicopter by means of the collective control system 120 and/or the manual throttle system 130. The collective control system 120 includes a collective control stick 125 (see FIG. 2) that is pivoted by the pilot to transmit a signal 122 directly to the rotor system 110 to collectively control the pitch of the rotor blades of the rotor system 110. Simultaneously, the collective control system 120 is operative to transmit corresponding signals 122L, 122R directly to the DECUs 18L, 18R to synchronize or coordinate the power output of the engines 12L, 12R with the corresponding collective pitch input to the rotor blades. The manual throttle system 130 allows the pilot to control dual-engine flight operations or OEI flight operations in the event of a failure of the DECUs 18L, 18R by providing mechanical control signals 132L, 132R directly to the engine fuel subsystems 16L, 16R.

The collective control stick 125 has a grip 126 that includes, inter alia, a three-position OEI switch assembly 127 as exemplarily illustrated in FIG. 2 and as illustrated in further detail in FIG. 2A. The three-position OEI switch assembly 127 functions as the OEI control system according to the present invention for controlling OEI power ratings during OEI flight operations of a dual-engine helicopter, allowing the pilot to select any of the three OEI power ratings available from the single operative engine 12L/12R. The switch assembly 127 includes a three-position, spring-loaded, centered-off select switch 128 that allows the pilot, during OEI flight operations, to manually select the 30-second power rating, the 2-minute power rating, or the maximum continuous OEI power rating by appropriate manual manipulation of the select switch 128 to a first position (depressed forward for the described embodiment of the select switch 128), a second position (depressed rearwardly for the described embodiment of the select switch 128), or a third position (depressed in the centered-off position for the described embodiment of the select switch 128), respectively. Manual manipulation of the select switch 128 to the first, second, or third position causes an appropriate control signal to be transmitted to the DECUs 18L, 18R that is indicative of selection of the 30-second power rating, the 2-minute power rating, or the maximum continuous OEI power rating, respectively.

The parametric indicators $22N1_L$, $22N1_R$ that are operative to display the engine gas speed generator parameter N1 function as the OEI monitoring system according to the present invention for monitoring OEI flight operations of a dual engine helicopter. An exemplary embodiment of a parametric indicator 22N for monitoring the N1 parameter during OEI flight operations is exemplarily illustrated in FIG. 3 (since the N1 tachometers $22N1_L$, $22N1_R$ have identical configurations and functional characteristics, the N1 tachometer/parametric indicator illustrated in FIG. 3 is identified by the reference characters "22N1" for simplicity]. The parametric indicator 22N1 is configured and operative to provide visual indications of the N1 parameter during dual-engine flight operations and during OEI flight operations (OEI flight operations includes real OEI emergency flight conditions as well as OEI flight training). The parametric indicator 22N1 includes a rotatable needle 22N1-2 that provides an analog indication of the N1 parameter and a digital readout 22N1-4 that provides a digital display of the N1 parameter. The N1 parameter displays of the parametric indicator 22N1 are provided in response to sensor signals generated by the corresponding N1 sensor $14N1_L/14N1_R$.

For dual-engine (DE) flight operations, the parametric indicator 22N1 comprises a first DE indicia 22N1-6 that defines the normal operating range for the N1 parameter, a second DE indicia 22N1-8 that defines the precautionary operating range for the N1 parameter, and a DE indicium 22N1-10 that defines the take off power limit for the N1 parameter. For the described embodiment of the parametric indicator 22N1 of the S-76C+ helicopter, the first DE indicia 22N1-6 is a colored arc segment (a green arc segment for the particular embodiment) that defines a normal operating range from 62% N1 to 98% N1; the second DE indicia 22N1-8 is a colored arc segment (a yellow arc segment for the particular embodiment) that defines a precautionary operating from 98% N1 to 100% N1; and the DE indicium 22N1-10 is a colored line segment (a red colored line segment for the particular embodiment) that defines the take off power rating of 100% N1.

For OEI flight operations, the parametric indicator 22N1 further comprises an expanded scale, OEI indicia 22N1-12 that defines the OEI precautionary operating range for the N1 parameter, with the lower limit of the expanded scale, OEI indicia 22N1-12 coinciding with the DE indicium 22N1-10 wherein the lower limit of the expanded scale, OEI indicia 22N1-12 (and concomitantly the DE indicium 22N1-10) defines the maximum continuous OEI power limit for the N1 parameter. The parametric indicator 22N1 further includes a first OEI indicium 22N1-14 that defines the 2-minute OEI power limit for the N1 parameter, and a second OEI indicium 22N1-16 that defines the 30-second OEI power limit for the N1 parameter. A zone defined between the first OEI indicium 22N1-14 and the second OEI indicium 22N1-16 defines the 30-second OEI operating range for the N1 parameter and a zone defined between the DE indicium 22N1-10 and the first OEI indicia 22N1-14 defines the 2-minute OEI operating range for the N1 parameter.

For the described embodiment of the parametric indicator 22N1 of the S-76C+ helicopter, the expanded scale, OEI indicia 22N1-12 is colored arc segment (a yellow colored arc segment for the particular embodiment) that defines the OEI precautionary operating range from 100% N1 to 104.6% N1; the first OEI indicium 22N1-14 is a colored dashed line segment (a yellow dashed line segment for the particular embodiment) that defines the 2-minute OEI power limit of 101.2% N1, and the second indicium 22N1-16 is a colored dashed line segment (a red dashed line segment for the particular embodiment) that defines the 30-second OEI power limit of 104.6% N1. The DECU 18L/18R functionally associated with the single operative engine 12L/12R is operative, during OEI flight operations, to implement protective logic routines (in the form of hardware, firmware, software, and/or combinations thereof) to automatically preclude the single operative engine 12L/12R from exceeding the 30-second OEI power rating, the 2-minute OEI power rating, or the maximum continuous OEI power rating, as applicable, during OEI flight operations.

For OEI flight operations, the parametric indicator 22N1 further comprises a first dedicated bi-colored lamp fixture 22N1-20 disposed in combination with the first OEI indicium 22N1-14 that defines the 2-minute OEI power limit for the N1 parameter and a second dedicated bi-colored lamp fixture 22N1-22 disposed in combination with the second OEI indicium 22N1-16 that defines the 30-second OEI power limit for the N1 parameter. For the described embodiment of the parametric indicator 22N1 for the S-76C+ aircraft, the first dedicated bi-colored lamp fixture 22N1-20 is centered on the outward radial end of the yellow dashed line segment 22N1-14 and the second dedicated bi-colored lamp fixture 22N1-22 is centered on the outward radial end of the red dashed line segment 22N1-16.

The illumination of the first and second dedicated bi-colored lamp fixtures 22N1-20, 22N1-22 is regulated by activation signals generated by the appropriate DECU 18L/18R in response to signals generated by the apposite sensor $14N1_L/14N1_R$ during OEI flight operations. These activation signals cause the first or second dedicated bi-colored lamp fixtures 22N1-20, 22N1-22 to illuminate in a first color when the 30-second OEI power rating or the 2-minute OEI power rating, respectively, is enabled for the single operative engine 12L/12R (as used herein, the "enabled" terminology indicates that the corresponding OEI power is "available" for usage, i.e., the appropriate DECU 18L/18R has reset the protective logic routine for the single operative engine 12R/12L to the appropriate OEI power rating, but further that the OEI power is not currently being used for OEI flight operations). These activation signals further cause the first or second dedicated bi-colored lamp fixtures 22N1-20, 22N1-22 to illuminate in a second color when the single operative engine 12L/12R is actually operating in the 30-second OEI operating range or the 2-minute OEI operating range, respectively. For the described embodiment of the parametric indicator 22N1 of the S-76C+ helicopter, the first color is green to indicate enablement and the second color is yellow to indicate usage.

In a representative OEI flight operation, e.g., a failure of one engine 12L/12R during a take off flight operation, the appropriate DECU 18L, 18R implements a protective logic routine that automatically causes the single operative engine 12R/12L to default to the 30-second power rating. Concomitantly, the appropriate DECU 18L/18R transmits an activation signal to the parametric indicator 22N1 of the single operative engine 12L/12R to cause the second bi-colored lamp fixture 22N1-22 to steadily illuminate in the first color, thereby alerting the pilot that the 30-second OEI power rating is enabled for the single operative engine 12L/12R.

Once the single operative engine 12R/12L has ramped up to operate within the 30-second OEI operating range, the appropriate DECU 18L/18R transmits an activation signal to the parametric indicator 22N1 of the single operative engine 12L/12R to cause the second bi-colored lamp fixture 22N1-22 to steadily illuminate in the second color, thereby alerting the pilot that the single operative engine 12L/12R is operating under the 30-second OEI power rating. Concomitantly, the appropriate DECU 18L/18R initiates a 30-second timer to record operation of the single operative engine 12L/12R within 30-second OEI operating range.

A predetermined time prior to expiration of the 30-second OEI power period, the appropriate DECU 18L/18R causes the illuminated lamp fixture 22N1–22 to flash at a predetermined rate to alert the pilot that the 30-second OEI power period is about to expire. This visual warning allows the pilot to expeditiously manually manipulate the select switch 128 to the second position, thereby causing the appropriate DECU 18L/18R to reset the protective logic of the single operative engine 12R/12L to the 2-minute OEI power rating at or before the expiration of the 30-second OEI power period.

Concomitantly, the appropriate DECU 18L/18R transmits an activation signal to the parametric indicator 22N1 of the single operative engine 12L/12R to cause the first bi-colored lamp fixture 22N1–20 to steadily illuminate in the first color, thereby alerting the pilot that the 2-minute OEI power rating is enabled for the single operative engine 12L/12R. Once the single operative engine 12R/12L has ramped down to operate within the 2-minute OEI operating range, the appropriate DECU 18L/18R transmits an activation signal to the parametric indicator 22N1 of the single operative engine 12L/12R to cause the first bi-colored lamp fixture 22N1–20 to steadily illuminate in the second color, thereby alerting the pilot that the single operative engine 12L/12R is operating within the 2-minute OEI operating range. Concomitantly, the appropriate DECU 18L/18R initiates a 2-minute timer to record operation of the single operative engine 12L/12R within the 2-minute OEI operating range.

A predetermined time prior to expiration of the 2-minute OEI power period, the appropriate DECU 18L/18R causes the illuminated lamp fixture 22N1–20 to flash at a predetermined rate to alert the pilot that the 2-minute OEI power period is about to expire. This visual warning allows the pilot to expeditiously manually manipulate the select switch 128 to the third position, thereby causing the appropriate DECU 18L/18R to reset the protective logic of the single operative engine 12R/12L to the maximum continuous OEI power rating at or before the expiration of the 2-minute OEI power period.

Once the single operative engine 12R/12L has ramped down to or below the maximum continuous OEI operating limit established by the DE indicium 22N1–10, the appropriate DECU 18L/18R extinguishes the bi-colored lamp fixture 22N1–20. Neither the first nor the second bi-colored lamp fixture 22N1–20, 22N1–22 is illuminated during the period when the single operative engine 12R/12L is operated under the maximum continuous OEI power rating, the lack of illumination of either the first or the second bi-colored lamp fixture 22N1–20, 22N1–22 providing a visual cue to the pilot that the single operative engine 12L/12R is being operated under the maximum continuous OEI power rating.

For the described embodiment of the parametric indicator 22N1 for the S-76C+ helicopter, the predetermined time when the first and second bi-colored lamp fixtures 22N1–20, 22 switch over from steady illumination to flashing illumination is 3 seconds prior to expiration of the applicable OEI operating period, and the predetermined rate of flashing is 2.5 Hz.

It will be appreciated that the functioning of the bi-colored lamp fixtures 22N1–20, 22 during OEI flight operations, as described immediately hereinabove, provides visual indications regarding OEI status that are readily perceived and cognizable by the pilot, and that greatly facilitate and enhance pilot performance during OEI flight operations. The use of two separate and distinct colors in the bi-colored lamp fixtures 22N1–20, 22 significantly reduces the need for prolonged focusing by the pilot on the parametric indicator 22N1 to ascertain the precise OEI status of the single operative engine 12R/12L, thereby facilitating and enhancing pilot performance during OEI flight operations.

A variety of modifications and variations of the present invention are possible in light of the above teachings. It is therefore to be understood that, within the scope of the appended claims, the present invention may be practiced otherwise than as specifically described herein.

We claim:

1. A monitoring system for a dual-engine helicopter for OEI flight operations, comprising:

a parametric indicator operative in response to sensor signals for monitoring an engine gas generator speed parameter N1 during dual-engine flight operations and OEI flight operations, said parametric indicator including a rotatable needle that is operative to provide a analog indication of the current value of the N1 parameter, a first DE indicia that defines a normal operating range for the N1 parameter during dual-engine flight operations, a second DE indicia that defines a precautionary operating range for the N1 parameter during dual-engine flight operations, a DE indicium that defines a take off power limit for the N1 parameter during dual-engine flight operations, an expanded scale, OEI indicia that defines an OEI precautionary operating range for the N1 parameter during OEI flight operations, and wherein the lower limit of said OEI precautionary operating range defines a maximum continuous OEI power rating for the N1 parameter during OEI flight operations, a first OEI indicium that defines a 2-minute OEI power rating for the N1 parameter during OEI flight operations, a second OEI indicium that defines a 30-second OEI power rating for the N1 parameter during OEI flight operations, said first and second OEI indicia in combination defining a 30-second OEI operating range for the N1 parameter, and said first OEI indicium and said DE indicium in combination defining a 2-minute OEI operating range for the N1 parameter, a first dedicated bi-colored lamp fixture disposed in combination with said first OEI indicium, and wherein said first dedicated bi-colored lamp fixture is operative in response to a first activation signal to illuminate in a first color to indicate that the 2-minute OEI power rating is enabled for a single operative engine and is operative in response to a second activation signal to illuminate in a second color to indicate that the single operative engine is operating in the 2-minute OEI operating range, and a second dedicated bi-colored lamp fixture disposed in combination with said second OEI indicium, and wherein said second dedicated bi-colored lamp fixture is operative in response to a first activation signal to illuminate in a first color to indicate that the 30-second OEI power rating is enabled for the single operative engine and is operative in response to a second activation signal to illuminate in a second color to indicate that the single operative engine is operating in the 30-second OEI operating range.

2. The monitoring system of claim 1 wherein said first and second bi-colored lamp fixtures are extinguished when the single operative engine is operating at or below said maximum continuous OEI power rating.

3. The monitoring system of claim 1 wherein said first OEI indicium is a colored dashed line segment and said second OEI indicium is a colored dashed line segment and wherein said first dedicated bi-colored lamp fixture is centered on an outward radial end of said colored line segment defining said first OEI indicium and said second dedicated bi-colored lamp fixture is centered on an outward radial end of said colored line segment defining said second OEI indicium.

4. The monitoring system of claim 1 further comprising:

a cyclic control stick having a grip; and a three-position OEI switch assembly integrated in combination with said grip of said cyclic control stick, said three-position OEI switch assembly including a three-position select switch that is operable to manually select a 30-second OEI power rating, a 2-minute OEI power rating, and a maximum continuous OEI power rating for a single operative engine during OEI flight operations by appropriate manual manipulation of said three-position select switch to a first position, a second position, and a third position, respectively.

5. A monitoring and control system for a dual-engine helicopter for OEI flight operations, comprising:

a parametric indicator operative in response to sensor signals for monitoring an engine gas generator speed parameter N1 during dual-engine flight operations and OEI flight operations, said parametric indicator including a rotatable needle that is operative to provide a analog indication of the current value of the N1 parameter, a first DE indicia that defines a normal operating range for the N1 parameter during dual-engine flight operations, a second DE indicia that defines a precautionary operating range for the N1 parameter during dual-engine flight operations, a DE indicium that defines a take off power limit for the N1 parameter during dual-engine flight operations, an expanded scale, OEI indicia that defines an OEI precautionary operating range for the N1 parameter during OEI flight operations, and wherein the lower limit of said OEI precautionary operating range defines a maximum continuous OEI power rating for the N1 parameter during OEI flight operations, a first OEI indicium that defines a 2-minute OEI power rating for the N1 parameter during OEI flight operations, a second OEI indicium that defines a 30-second OEI power rating for the N1 parameter during OEI flight operations, said first and second OEI indicia in combination defining a 30-second OEI operating range for the N1 parameter, and said first OEI indicium and said DE indicium in combination defining a 2-minute OEI operating range for the N1 parameter, a first dedicated bi-colored lamp fixture disposed in combination with said first OEI indicium, and wherein said first dedicated bi-colored lamp fixture is operative in response to a first activation signal to illuminate in a first color to indicate that the 2-minute OEI power rating is enabled for a single operative engine and is operative in response to a second activation signal to illuminate in a second color to indicate that the single operative engine is operating in the 2-minute OEI operating range, and a second dedicated bi-colored lamp fixture disposed in combination with said second OEI indicium, and wherein said second dedicated bi-colored lamp fixture is operative in response to a first activation signal to illuminate in a first color to indicate that the 30-second OEI power rating is enabled for the single operative engine and is operative in response to a second activation signal to illuminate in a second color to indicate that the single operative engine is operating in the 30-second OEI operating range;

a cyclic control stick having a grip; and a three-position OEI switch assembly integrated in combination with said grip of said cyclic control stick, said three-position OEI switch assembly including a three-position select switch that is operable to manually select said 30-second OEI power rating, said 2-minute OEI power rating, and said maximum continuous OEI power rating for a single operative engine during OEI flight operations by appropriate manual manipulation of said three-position select switch to a first position, a second position, and a third position, respectively.

* * * * *